UNITED STATES PATENT OFFICE.

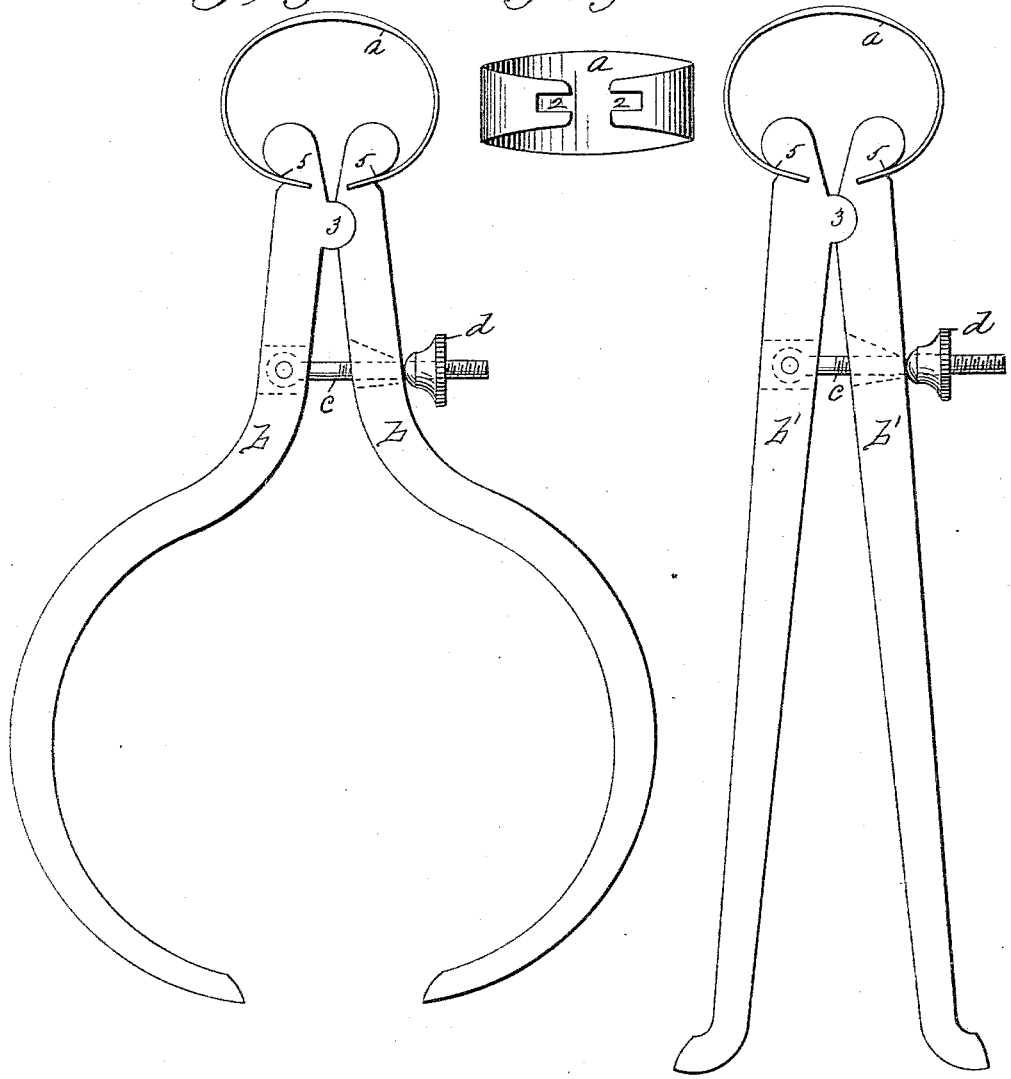

CHARLES P. FAY, OF SPRINGFIELD, MASSACHUSETTS.

SPRING-CALIPERS.

SPECIFICATION forming part of Letters Patent No. 319,215, dated June 2, 1885.

Application filed January 5, 1885. (No model.)

*To all whom it may concern:*

Be it known that I, CHARLES P. FAY, a citizen of the United States, residing at Springfield, in the county of Hampden and State of Massachusetts, have invented new and useful Improvements in Spring-Calipers, of which the following is a specification.

This invention relates to improvements in spring-calipers, the object being to provide an improved caliper of this class, embodying what is generally termed "knockdown" features, whereby the legs and the spring are separable from each other, and the latter may be used interchangeably with different utensils.

In the drawings forming part of this specification, Figures 1 and 2 illustrate, respectively, in side elevation outside and inside calipers constructed according to my invention. Fig. 3 illustrates the caliper-spring separate from the caliper.

In the drawings, $b\ b$, Fig. 1, are the legs of the caliper, of the usual form at their lower ends, and provided with the usual screw-rod, $c$, pivoted to one leg and passing through the other, and having thereon the nut $d$, whereby the ends of the legs are adjusted to their requisite positions. The legs $b\ b$ swing upon a fulcrum between the screw-rod $c$ and the bearing-points of the spring $a$, consisting of a curved laterally-projecting short arm, 3, on one leg, and a socket or recess in the other leg opposite said arm, adapted to receive the end of the latter. The outside edges of the legs $b\ b$, above said fulcrum, are provided with suitable notches at 5, to provide for the proper engagement of the ends of the spring $a$ therewith. The spring $a$ is of the C form, of greatest thickness opposite the opening between its ends, and the latter have the slots 2 2 therein, whereby said ends straddle the legs $b$ at their notched points 5, the base of each slot 2 being, by the action of the spring, firmly held against the leg. The slotted form of the spring at its ends, whereby the ends of the legs are engaged therewith, as above set forth, together with the screw-rod $c$, conduces to hold the legs of the caliper in such a manner that they remain in the same plane as they would were they provided with the usual pivoted-joint connection.

The manner of applying the spring $a$, together with the short-lever construction of the legs above the fulcrum, results in comparatively little movement of the ends of the spring when the legs swing, and hence a strong, stiff spring may be employed, which lends solidity to the whole structure, and obviates the liability of the spring to break. Fig. 2 shows the same spring $a$ applied to legs $b'\ b'$ of an inside caliper, and, if desired, the same spring application may be made to the legs of a compass provided with the rod $c$ and nut $d$, or other suitable well-known means for holding and adjusting them and the fulcrum-point 3, as shown.

What I claim as my invention is—

1. In a caliper or similar implement, the combination of two legs having, respectively, a fulcrum and socket, as at 3, a curved spring embracing said legs, and an adjusting device for the legs, substantially as described.

2. In a caliper or similar implement, the combination, with the notched legs having fulcrum-and-socket bearing, of the curved spring having notched ends resting in the notches in the legs, and with an adjusting-screw, substantially as described.

CHARLES P. FAY.

Witnesses:
H. A. CHAPIN,
WM. H. CHAPIN.